(No Model.) 2 Sheets—Sheet 1.
H. A. WAHLERT.
AUTOMATIC CAR BRAKE.
No. 351,139. Patented Oct. 19, 1886.
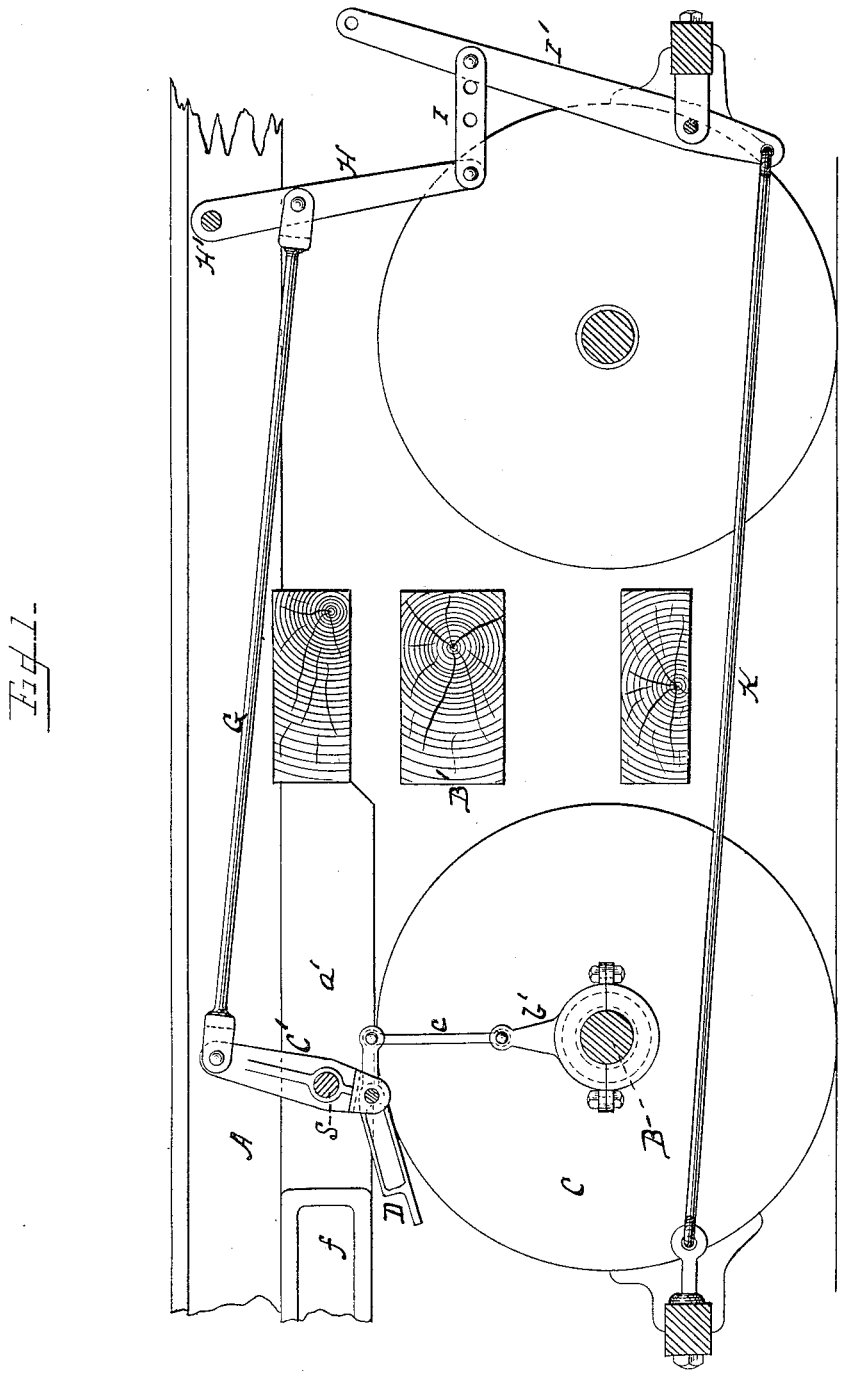
Witnesses
G. A. Tauberschmidt
F. P. Metzger
Inventor
Henry A Wahlert
by F. W. Ritter Jr
Atty

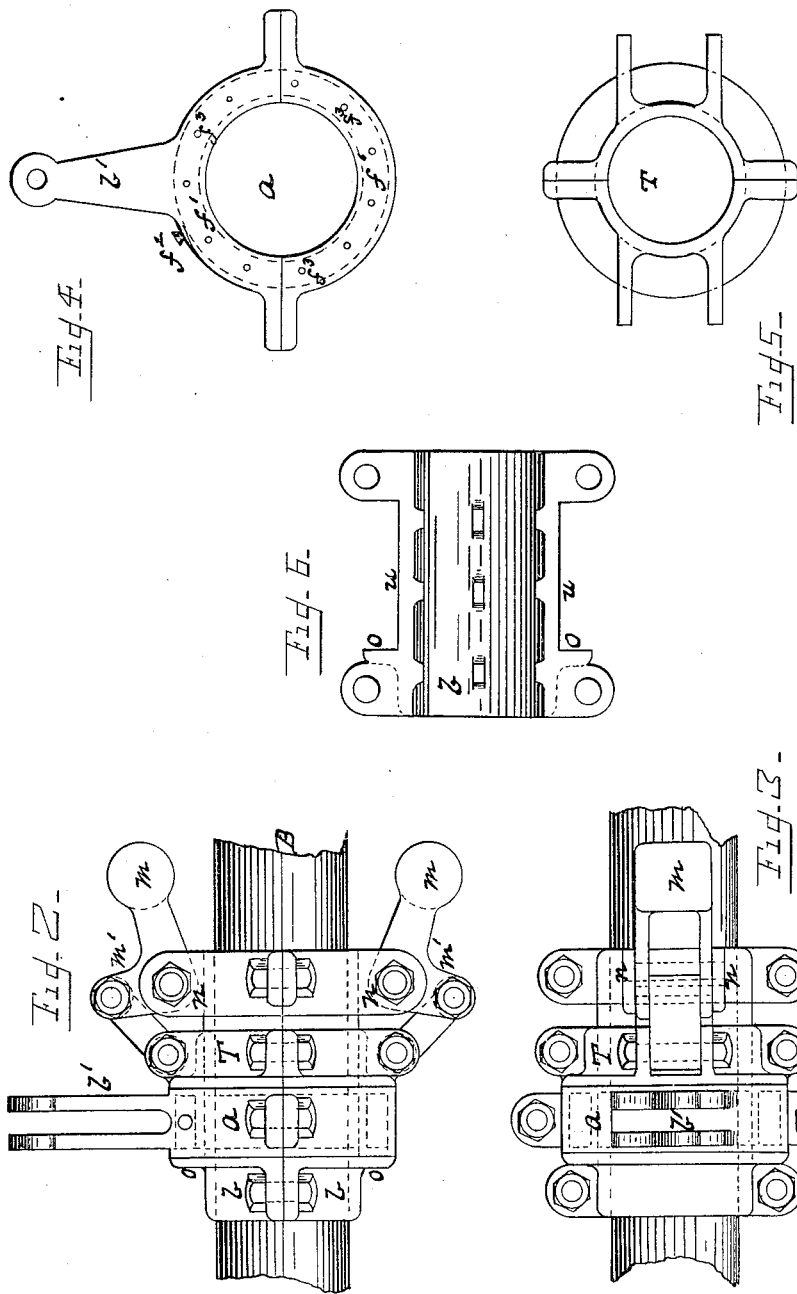

UNITED STATES PATENT OFFICE.

HENRY A. WAHLERT, OF ST. LOUIS, MISSOURI, ASSIGNOR TO THE AMERICAN BRAKE COMPANY, OF SAME PLACE.

AUTOMATIC CAR-BRAKE.

SPECIFICATION forming part of Letters Patent No. 351,139, dated October 19, 1886.

Application filed January 20, 1886. Serial No. 189,192. (No model.)

*To all whom it may concern:*

Be it known that I, HENRY A. WAHLERT, a citizen of the United States, residing at St. Louis, in the State of Missouri, have invented certain new and useful Improvements in Automatic Car-Brakes; and I hereby declare the following to be a full, clear, and exact description of the same, reference being had to the accompanying drawings, wherein—

Figure 1 is a longitudinal section of a portion of a car bed and truck, showing an automatic brake mechanism embodying my invention. Figs. 2 and 3 are detail elevations (one at right angles to the other) of the governor and friction-clutch mechanism. Fig. 4 is a face view of the friction disk or clutch. Fig. 5 is a detached view of the sliding disk of the governor. Fig. 6 is a detail view of the sleeve which carries the governor-arms, and forms the bearing of the friction-disk and slide-disk.

Like letters refer to like parts wherever they occur.

My present invention relates to the construction and operation of automatic brakes, and has for its object to simplify and reduce the required number of parts, relieve them from such disturbing elements as the swiveling of the truck, variations of load, lost motion of axle, truck and car-bed, insure the disengagement of the push-bar or detent when the car is at low speed, and facilitate the connection between the brake-levers and power-lever independent of the character of obstructions on the truck.

In all automatic brakes operated from a movable draw-bar the object is to interpose a push-bar, latch, or detent between a movable draw-bar and a power-lever which is connected to the brake-levers at such times as the train is at speed, so that the impact on arrest of motion shall apply the brakes and to withdraw such detent when the train is at a low rate of speed or stationary.

Heretofore, especially where centrifugal governors have been employed to control the push-bar or detent, the power of the governor has been utilized to withdraw an obstruction (such as sliding disk or its equivalent) and permit the push-bar or detent to be brought into active relation with the other parts of the mechanism by gravity; or, in other words, the power of the governor has been utilized by indirect means rather than by direct means. This is objectionable, as high speed gives the governor power, and it is at such times the brake is required, while low speed is a condition of absence of power, and then brakes are not needed.

The main feature of my invention may therefore be stated as utilizing the power of the governor to complete the active relation of the parts, to apply the brakes, and utilizing gravity which is a constant power to break the combination or disturb the operative relation of the parts.

Again, the consequence of utilizing the power of the governor at high speed in an indirect way, as before specified, has been the multiplication of parts (or intermediate devices) whose necessary arrangement and number have caused them to be supported from the truck and rendered them incapable of adjusting themselves to the constantly-changing relations of the bed, pivoted truck, and axle; consequently the natural motions as well as those due to lateral and longitudinal play of the axle, &c., resulting from lost motion of the parts, have been constant disturbing elements or conditions. As a consequence of applying the power of the governor directly to the push-bar or detent, I am enabled to dispense with any other connections than a suspended flexible connection, which enables the automatic adjustment of the parts or devices to meet the varying relations of the bed and axle.

There are other minor features which relate more particularly to the construction of the parts, and which will hereinafter more fully appear.

I will now proceed to describe my invention more specifically, so that others skilled in the art to which it appertains may apply the same.

In the drawings, A indicates the bed or car-body; a', the draw-bar timbers; B', the truck bolsters; B, the axle; C, the wheels, and f the end of the movable draw-bar, all of which may be of any approved description. Upon the axle B is secured a centrifugal governor, preferred construction of which is as follows:

$b\ b$ is a sleeve formed of two longitudinal sections, having on its inner face chipping-lugs or fitting-strips to facilitate its adjustment to axles of varying diameters or irregular shapes, and to enable it to be securely clamped to the axle B. The sleeve-sections are bolted together on the shaft in the usual manner.

Upon the exterior of the sleeve $b\ b$ are formed the lugs $n$, for pivoting the centrifugal arms of the governor thereto, and a flange, $o$, for confining the friction-clutch. The intermediate portion of the sleeve, as at $u$, is finished as a bearing for the slide ring or disk T of the governor and the ring friction-clutch $a$. The sliding disk T is formed in two parts, and when in position around the sleeve said sections are bolted together and connected by links, arms, or levers and with the short arm of the elbow-levers $m'$, which carry the centrifugal balls $m$ of the governor. This construction dispenses with springs on the governor-arms.

$a$ indicates the friction-clutch, which coacts with the governor-disk T in applying the power directly from the governor to the push-bar, latch, or detent, as the case may be. In the present instance this friction-clutch is a hollow two-part ring, which sections, when in position, as shown, may be bolted or otherwise connected together so as to loosely encompass the axle and sleeve $b\ b$. When the parts are in use, the friction between the sleeve and friction-clutch will be little and immaterial; but as it may become necessary to lubricate the friction-surface $f'$ of the clutch where the sliding disk T comes in contact with it, I prefer to cast the ring hollow, as before specified, so that it may be packed with cotton waste, asbestus packing, or any equivalent which will hold and transmit a lubricant, which may be inserted before the ring-sections are put in position and bolted together, and I also provide a filling-hole, $f^2$, for replenishing the packing with oil or other lubricant, and an orifice or orifices, $f^3$, through which it can escape to lubricate the friction-face of the clutch.

C' indicates the power-lever by which the power is transmitted to the brake-levers, said power-lever having its fulcrum S in rear of the movable draw-bar and provided with a push-bar or detent, D, pivoted on its lower arm. The push bar or detent D is so balanced that when released by the governor it will gravitate or drop out of engagement with the draw-bar, (see Fig. 1,) by which means the automatic brake mechanism will be rendered inoperative when the train is at low speed or at rest. The only remaining thing to be done is to combine the push-bar or detent and the friction clutch by a flexible connection which will adjust itself to all changes of position between the axle and car-bed, whether the same be due to such natural causes as swiveling of the truck and loading of the car, or to incidental changes resulting from lost motion, wear, &c. This connection, as preferred by me, is made by means of a pivoted lever or link, $c$, which connects the tail-piece of the push-bar or detent with an arm, $b'$, on the friction-clutch. This arrangement of the power-lever C' enables the rod G, which connects it with the system of brake-levers, to be passed over the truck and close under the floor of the car. G indicates said rod, which connects with a lever, H, having its fulcrum H' on the car-timbers, and the lever H is in turn connected by an adjustable link, I, with the brake-lever I', which has its fulcrum on the brake-beam.

K indicates the rod which connects the short arm of lever I' with the opposite brake-beam.

The devices being substantially of the character described will, when the train is at rest or low speed, occupy the position shown in Fig. 1, the push-bar or latch disengaged from the draw-bar by gravity; but when the proper speed to operate the governor is reached the sliding disk of the governor is forced into contact with the ring, forming a friction-clutch which transmits the power of the governor through the flexible connection $c$ to the tail of the push-bar or detent and raises the push-bar or detent, or brings it into such relation with the draw-bar and power-lever that the movement of the draw-bar is transmitted to the power-lever.

Having thus fully described the nature, operation, and advantages of my invention, what I claim, and desire to secure by Letters Patent, is—

1. In an automatic brake, the combination, with a push-bar or detent and a governor, of an interposed friction-clutch for applying the power of the governor to the detent, substantially as and for the purposes specified.

2. In an automatic brake, the combination of a push-bar or detent, a governor, a friction-clutch for applying the power of the governor to the detent, and a flexible connection between the friction-clutch and push-bar or detent, substantially as and for the purposes specified.

3. In an automatic brake, the combination of a movable draw-bar, a power-lever, one end of which extends above the draw-bar, and whose other end is provided with a push-bar or detent for engaging with the draw-bar, an intermediate power-lever having its fulcrum on the bed, and connections from the power-lever to the bed-lever, and from thence to the brake-levers, substantially as and for the purposes specified.

4. A friction-disk having a packing-chamber and lubricating-ports leading to the friction-face of the disk, substantially as and for the purposes specified.

5. In a governor, the combination, with the governor-arms, of a sleeve which supports the arms and forms a bearing for the sliding disk and friction-clutch, substantially as and for the purposes specified.

6. In mechanism for actuating automatic brakes, the combination of an automatic governor, and a friction-clutch for transmitting the power of the governor, substantially as and for the purposes specified.

7. In an automatic brake mechanism, the combination of a movable draw-bar, a power-lever, and a push-bar or detent suspended from the power-lever below the draw-bar, substantially as and for the purposes specified.

In testimony whereof I affix my signature in presence of two witnesses, this 2d day of January, 1886.

HENRY A. WAHLERT.

Witnesses:
GEORGE H. POOR,
E. B. LEIGH.